United States Patent [19]

Urai

[11] Patent Number: 4,874,448

[45] Date of Patent: Oct. 17, 1989

[54] METHOD OF MAKING SEAT-LIKE OBJECT

[75] Inventor: Muneharu Urai, Tokyo, Japan

[73] Assignee: Tachi-S Co., Ltd., Tokyo, Japan

[21] Appl. No.: 195,479

[22] Filed: May 9, 1988

Related U.S. Application Data

[63] Continuation-in-part of Ser. No. 883,992, Jul. 10, 1986, abandoned.

[51] Int. Cl.⁴ .......................... B29C 51/14; B65G 7/00
[52] U.S. Cl. ...................................... 156/196; 156/228; 156/245; 156/306.6; 29/91; 29/91.1
[58] Field of Search ............... 156/196, 228, 242, 245, 156/290, 306.6; 264/248, 257, 259, 266, 294, 321, DIG. 62, DIG. 64, DIG. 77; 29/91, 91.1

[56] References Cited

U.S. PATENT DOCUMENTS

| | | | |
|---|---|---|---|
| 3,244,571 | 4/1966 | Weisman | 264/321 |
| 3,528,866 | 9/1970 | Stevens | 156/306.6 |
| 3,954,537 | 5/1976 | Alfter et al. | 156/306.6 |
| 4,088,805 | 9/1978 | Wiegand | 156/306.6 |
| 4,107,829 | 8/1978 | Urai et al. | 156/196 |
| 4,138,283 | 2/1979 | Hanusa | 156/245 |
| 4,323,410 | 4/1982 | Urai | 156/228 |
| 4,559,094 | 12/1985 | Hostetler et al. | 156/212 |
| 4,619,725 | 10/1986 | Muraishi et al. | 156/228 |
| 4,718,153 | 1/1988 | Armitage et al. | 29/91 |
| 4,737,226 | 4/1988 | Inoue | 156/306.6 |

Primary Examiner—Caleb Weston
Attorney, Agent, or Firm—Oldham & Oldham Co.

[57] ABSTRACT

Disclosed is a method of making a seat-like object comprising a leather touch surface layer and a urethane cushion body stuck together. It uses a weld sheet intervening between the surface layer and the cushion body in place of application of an adhesive substance to the surface layer and the cushion body. The weld sheet when heated above its melting temperature, will weld and stick the surface layer and the cushion body together, maintaining the leather touch over the whole surface area of the product, still allowing air to pass in or out.

5 Claims, 3 Drawing Sheets

FIG. 1
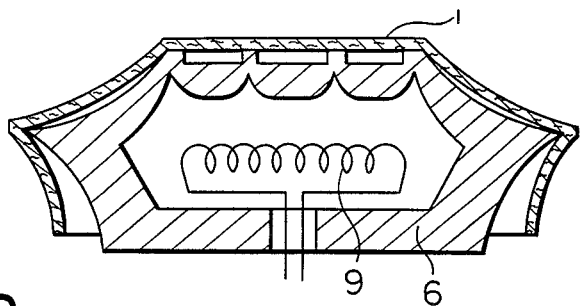
FIG. 2
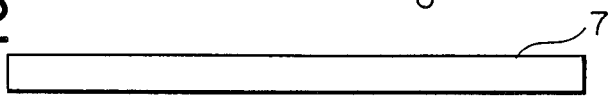
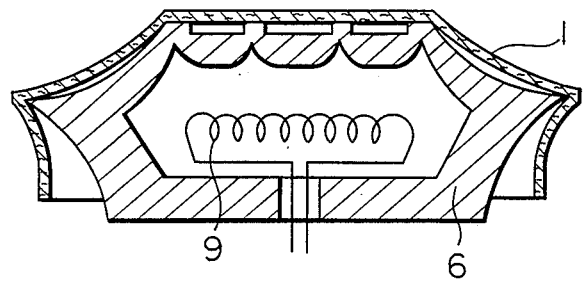
FIG. 3
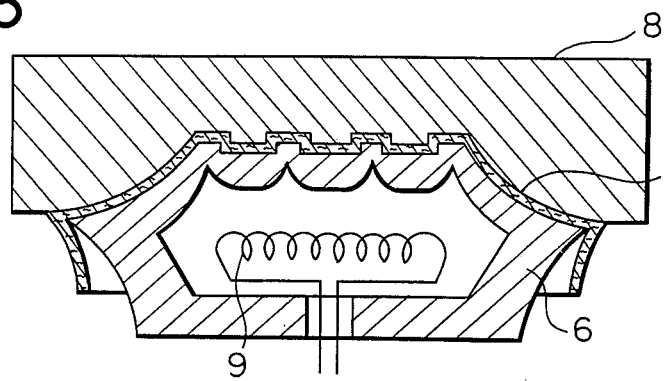
FIG. 3A
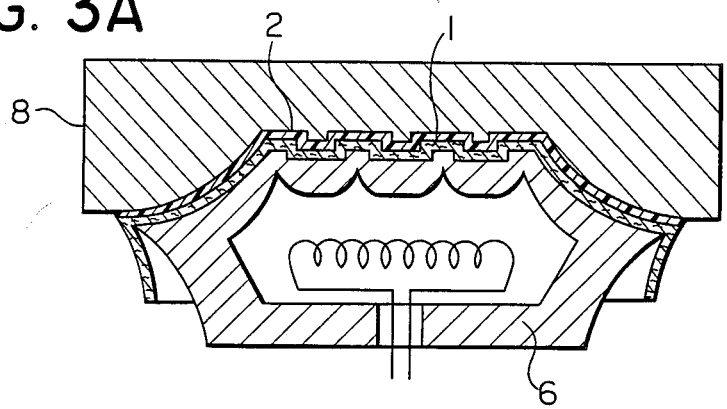

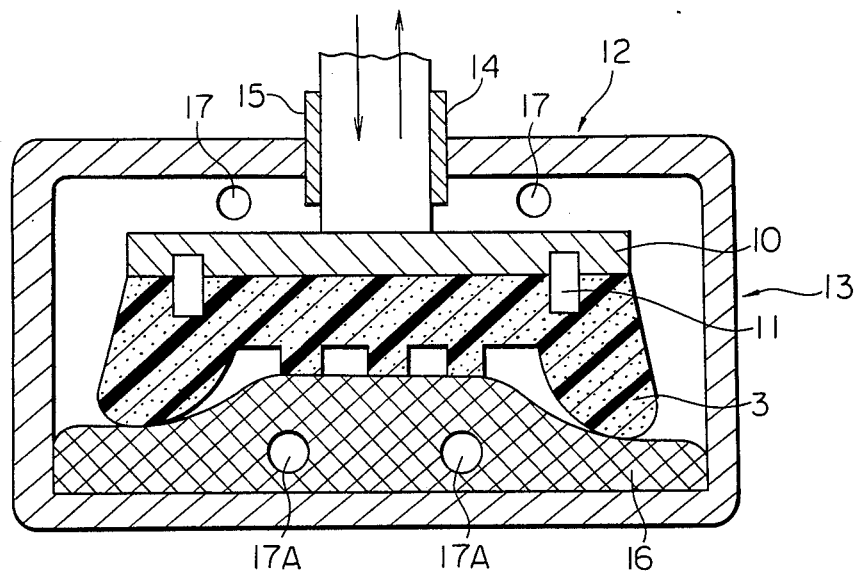
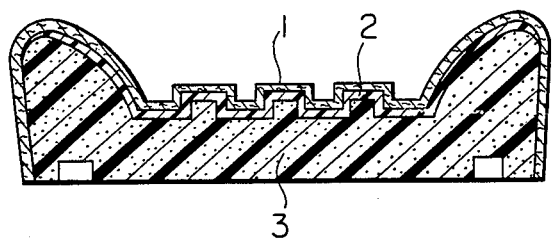
FIG. 8
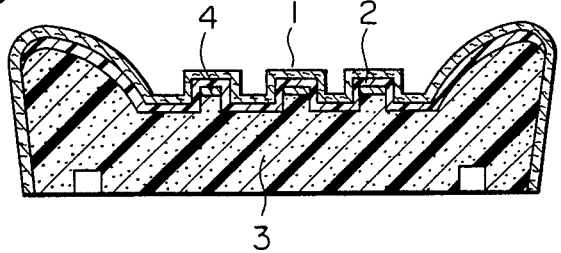
FIG. 9
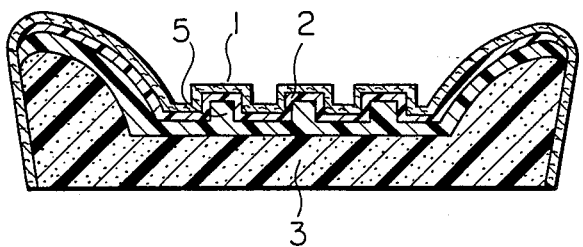
FIG. 10

METHOD OF MAKING SEAT-LIKE OBJECT

This is a continuation-in-part application of co-pending patent application, Ser. No. 883,992, filed July 10, 1986, now abandoned.

BACKGROUND OF THE INVENTION

1. Field of the Invention

The present invention relates to a method of making a seat-like object, which is composed of a cushion body and a leather touch surface layer stuck together, presenting a pleasing appearance appropriate for ornamental purposes and assuring sitting comfortableness when used as a seat.

2. Description of the Prior Art

A conventional method of making a seat-like object comprises the steps of: preparing upper and lower molds which are adapted to define the same shaped or contour as an upper surface of a seat-like object to be formed when combined with each other; sandwiching and heating, under pressure, a surface layer secured to the lower mold between the upper and lower mold to shape the surface layer; separating the upper mold away from the lower one to expose one surface of the surface layer; applying an adhesive substance to at least one of the surface of the surface layer and a mass of cushion material in the form of non-skinned molded body or slab with the aid of a brush or a spray gun; and again pressing the surface layer and the cushion body with lower mold under pressure to provide a seat-like object.

Such conventional method and the seat-like object thus made have defects as follows:

(a) Even application of adhesive substance to the whole surface of the surface layer and/or that of the cushion material by means of brushes or spray guns is very difficult. Adhesive marks are likely to appear at places where the adhesive substance is applied too thick whereas the surface layer is likely to peel off at places at which the adhesive substance is applied too thin. Such adhesive marks will present unpleasing appearance, and at the same time, they will make the surface layer hard in places, not allowing air to pass in and out.

(b) Extra cost for installations for spraying and industrial hygiene is involved. Extra adhesive-applying and laminate-pressing steps are required, too.

(c) Speaking about an adhesive substance, for instance, for urethane resin, it takes about 45 seconds before completing adhesion at the surrounding temperature of 18° C., and it takes about 60 seconds at the surrounding temperature of 5° C. Thus, extra installation will be required for maintaining the surroundings at a temperature appropriate for expediting adhesion.

(d) If an adhesive substance is applied to a surface layer, and if the surface layer is not applied to a cushion material early enough the applied adhesive substance will lose its capability of sticking the surface layer and the cushion body together.

(e) If it is desired that an ornamental trim cover having an embossed pattern is made of a non-expansible material, usually such surface layer material is cut in the form of development from a desired three-dimensional shape, and then the surface layer is sewed with a sewing machine into the desired shape. The trim cover thus shaped is applied to a urethane molded body of the same shape. These works, however, require skillfulness and increase in the number of steps.

SUMMARY OF THE INVENTION

With the defects listed above in mind a method of making a seat-like object according to the present invention comprises the steps of: sandwiching and heating, under pressure, a surface layer between upper and lower molds having the same shape as a cushion body to give the surface layer the same shape as the cushion body; and putting and heating a weld sheet between the preshaped surface layer and the cushion body, thereby causing the weld sheet to melt and stick the surface layer and the cushion body together.

Alternately, a method of making a seat-like object according to the present invention comprises the steps of: laying a surface layer of good expansibility, a weld sheet and a cushion body on each other in the order named; and heating the intervening weld sheet until it melts, thereby sticking the surface layer and the cushion body together.

Thanks to the use of an intervening weld sheet between a surface layer and a cushion body they can be evenly stuck together without difficulty, so that a pleasing appearance results in the product.

The present invention will be better understood from the following description of preferred embodiments of the present invention.

BRIEF DESCRIPTION OF THE DRAWINGS

FIG. 1 shows a step at which a surface layer is applied to a lower mold;

FIG. 2 shows a step at which the surface layer is heated;

FIG. 3 shows a step at which the surface layer is compressed to a desired shape;

FIG. 3A shows a step at which a weld sheet along with the surface layer are heated under pressure to a desired shape;

FIG. 7 shows a step at which the cushion body is heated prior to application of the surface layer to the cushion body;

FIG. 8 shows, in cross section, a seat-like object after being removed from the lower mold subsequent to the step as shown in FIG. 6;

FIG. 9 is a view similar to FIG. 8, showing a different seat-like object having strips at selected areas on the cushion body; and FIG. 10 is a view similar to FIG. 8, showing a still different seat-like object having a shaped slab and a urethane molded body in combination.

DETAILED DESCRIPTION OF THE PREFERRED EMBODIMENTS

A method of making a seat-like object according to the present invention is described below with reference to the accompanying drawings.

At the step as shown in FIG. 1 a surface layer 1 is reversed, and is applied to a lower mold 6 whose upper surface has a shape just opposite to the outer shape of a seat-like object to be formed.

At a subsequent step as shown in FIG. 2 a heater 7 is brought to the vicinity of the lower mold 6 to heat the surface layer 1 lying on the lower mold 6.

At a subsequent step as shown in FIG. 3 an upper mold 8 is pushed against the lower mold 6 to compress the preheated surface layer 1 into a desired final shape. As shown, the upper mold 8 has a shape complementary to the shape of the lower mold, that is, similar to the final shape of the seat-like object to be formed.

Figure 4:
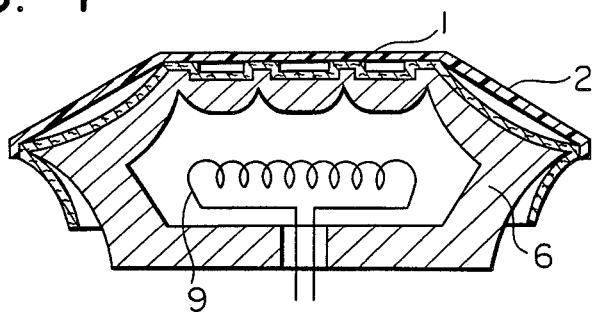
FIG. 4 shows a step at which a weld sheet is laid on the surface layer.

At a subsequent step as shown in FIG. 4 a piece of weld sheet 2 is put on the surface layer 1 which is still closely applied to the lower mold 6.

Figure 5:
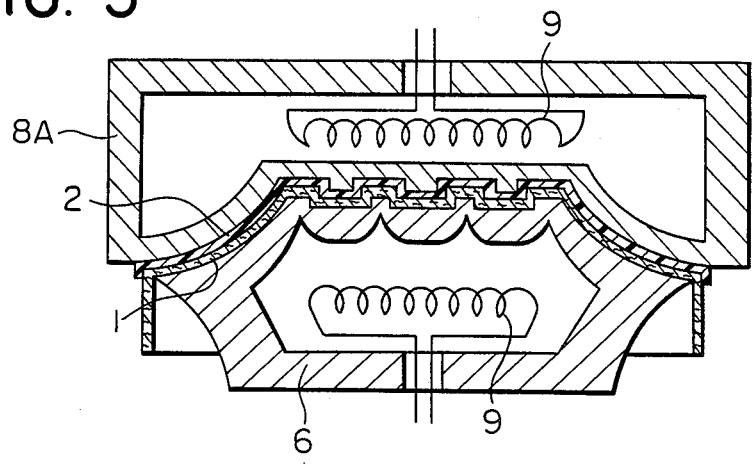
FIG. 5 shows a step at which an upper mold is applied to heat and mold the laminate to a final shape.

At a subsequent step as shown in FIG. 5 another or second upper mold 8A is pushed against the weld sheet to heat the same under pressure. Then, the weld sheet 2 is changed in shape so as to be in conformity with the shape defined by the upper and lower molds in combination. Heaters 9 are put in the hollow spaces of the upper and lower molds for the purpose of heating the weld sheet 2. Note that the weld sheet 2 is changed in shape (not melted) at a temperature lower than the temperature at which the surface layer 1 is shaped with separate heater 7.

Figure 6:
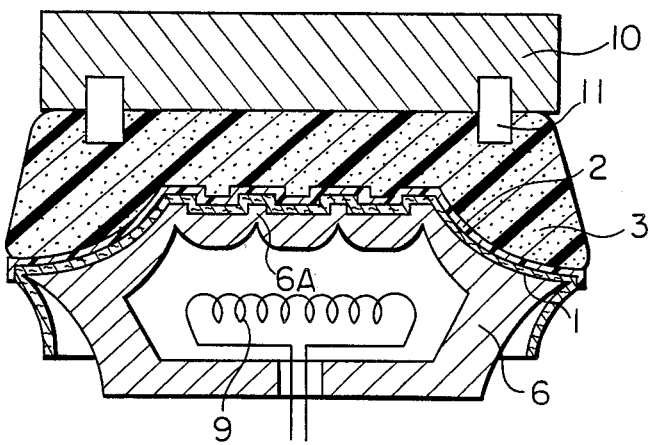
FIG. 6 shows a step at which the surface layer is welded to a cushion body by heating the intervening weld sheet.

Finally, at a step as shown in FIG. 6 the second upper mold 8A (FIG. 5) is removed, and a cushion body 3 of skinless urethane molded body or cut-and-shaped urethane slab is put in place. Then, a press plate 10 with positioning pins 11 is brought in alignment with the lower mold 6, and then it is pushed against the cushion body 3. Thus, the cushion body is compressed, and the weld sheet 2 is heated by means of the heater 9 until the weld sheet is melted, thereby welding and joining the surface layer 1 and the cushion body 3 together. A seat-like object results when the materials are removed from the lower mold. Note that the surface layer 1 cannot melt at a temperature at which the weld sheet melts. The projection 6A of the lower mold 6 have cavities on their back sides, thereby preventing the fall of the temperature at the projections below the temperature of the reamining part of the lower mold, which otherwise would take place if the projections were not hollow. As a substitute for the heaters 9 in upper and lower molds 8, 8A and 6 a heated gas or steam may be used. Then, a lot of small holes are made in the upper and lower molds for permitting heated gas or steam to pass through the upper and lower molds as well as through the variable cushion body and surface layers, thereby heating the surface layer 1 and the weld sheet 2. The surface layer 1 is made of a fabric such as moquette which allows air to pass therethrough.

The weld sheet 2 is melded by the heat and is partly dispersed into the surface layer 1 and into the lower permeable cushion body 3 to allow air to pass in and out of the article formed by the surface layer and the cushion body 3.

FIG. 8 shows, in section, the seat-like object which is provided by removing from the lower mold subsequent to the step of FIG. 6 and by pulling the skirt of the surface layer over the cushion body. The weld sheet 2, in fact, is melted and invaded into the thickness of the surface layer 1 and the surface thickness of the cushion body 3. Generally, the weld sheet 2 is thin enough to allow air to pass through the integration of surface layer and cushion body, after it is melted.

Possible combination of steps selected among those as shown in FIGS. 1 to 6 are as follows:

(a) Combination of steps as shown in FIGS. 1, 2, 4, 3A and 6 in the order named: while a surface layer 1 is heated and kept at an increased temperature (FIG. 2), a weld sheet 2 is laid on the surface layer 1 (FIG. 4), and then the laminate is sandwiched and shaped between the upper and lower molds (FIG. 3A). The weld sheet 2 is welded to stick the surface layer 1 and the cushion body 3 together (FIG. 6).

(b) Combination of steps as shown in FIGS. 1, 2, 3, 4 and 6: this may be used in case that a cushion body has a relatively even surface, requiring no extra shaping of the weld sheet 2 as in FIG. 3A. The weld sheet 2 is shaped and welded at once at the step of FIG. 6.

(c) At the step as shown in FIG. 1 a weld sheet 2 is put on the surface layer 1, and then a cushion body 3 is put on the weld sheet 2 as in FIG. 6. Then, the composite body is pressed and shaped with the aid of the press plate 10 and the heater 9. As a result the surface layer 1 and the cushion body 3 are stuck together. This method can be applied to a surface layer and a weld sheet both of which are easy to expand, or to a cushion body 3 whose surface is even or regular enough to allow only the press plate 10 to give a desired form to the surface layer and weld sheet under pressure.

(d) Even though a surface layer 1 is hardly expandable in its nature, the surface layer is cut in a developed form which may be later built in a desired three-dimensional shape, and then the method just described in paragraph "C" may be used with the surface layer 1 put on the lower mold 6.

(e) The steps described above may be appropriately selected and combined depending on the kinds of material and particular shapes of surface layer and weld sheet, and depending on the final shape into which a seat-like object is to be formed.

FIG. 7 shows a device 12 for preheating a urethane molded body 3 as comprising a closed casing 13, a perforated base 16 put on the bottom of the casing and having a shape complementary to a urethane molded body to be heated, and a pressing plate 10 having positioning pins 11 and an operating rod 14 fixed to the opposite surfaces of the pressing plate 10 respectively. As indicated by arrows the pressing plate 10 can be raised and lowered in the casing, thereby compressing and releasing the cushion body 3. When the cushion body 3 is pushed against the base 16 by the pressing plate 10, air is purged from the urethane mold or slab 3 through its small holes, and then the purged air escapes from the vents 17 of the casing 13. Then, the pressing plate 10 is raised, and, at the same time, heated air is drawn into the casing through ducts 17A of the base 16. The cushion body 3 resiliently returns to its original stress-free volume, allowing the heated air to enter the small holes of the porous body. This is repeated until the porous body 3 is filled with hot air, thus raising the temperature of the cushion body 3. Then, the cushion body 3 is removed from the casing 13, and it is immediately subjected to the pressing-and-sticking process as shown in FIG. 6. Then, the cushion body 3 is pressed against the weld sheet 2 by the pressing plate 10. The cushion body 3 is hot enough to cause the intervening weld sheet to weld and stick the surface layer 1 and the cushion body 3 together.

This preheating process is found to be appropriate for the purpose of compensating for the decrease of the temperature of the lower mold 6 at its projections 6A, thereby assuring good adhesion between the surface layer 1 and the cushion body 3 along the irregular boundary therebetween. Such preheating back up the heating of the lower mold 6 by its heater 9. In some instances the heater 9 may be omitted. Alternatively, the preheating may be performed simply by immersing a cushion body is a hot bath for a while.

Heating is described and shown as being conducted with recourse to heaters designated at 9. As an alternative, however, heated gas or steam may be supplied into the upper and lower molds. Then, the upper and lower molds may be made of a porous material. Otherwise, many small holes may be made in the inside surfaces of these molds which are to be brought in contact with a surface layer and a weld sheet, thereby allowing hot gas or steam to blow off against the surface layer and the weld sheet. Heating may be controlled by appropriately selecting the size and/or position of small holes made in the upper and lower molds. Incidentally, a thin rubber sheet may be used as a substitute for an upper mold, and then a surface layer may be shaped into a desired contour simply by applying a negative pressure to the rubber sheet.

FIGS. 8 to 10 show different structures of seat-like objects made by the present invention. In place of an expansible surface layer, a surface layer composed of expansible and non-expansible portions may be used. Then, the expansible portion of the surface layer may be allotted to form the part of the seat-like object which requires the expansion of the surface layer in forming a final shape whereas the non-expnasible portion may be allotted to form the part of the seat-like object which requires no expansion in giving the final shape to the seat-like object. Otherwise, a surface layer may be the one which is prepared by cutting and expanding from a desired three-dimensional shape. Sometimes, a surface layer can be composed of two or more materials of different colors.

As for a weld sheet it may be of woven cloth, unwoven cloth, or paper, and may be in the form of net, tape or film. These materials are so that they weld, for instance, at the temperature ranging from 80° to 150° centigrade, and that the weld sheet does not become hard at welds. Nylonhalf (trade name) or Meltwave (trade name) may be used.

A cushion body may be preferably made from non-skinned urethane foam. Then, after being welded to the surface layer by means of the intervening weld sheet the urethane cushion body will not allow the surface layer to peel off from the cushion body, as would be experienced if a skinned urethane molded body were used. In case that a skinned urethane molded body is used, the skin is removed at selected portions at which a surface layer is welded to the cushion body lest peeling-off should be caused.

As shown in FIG. 9, strips 4 of a foam material whose specific gravity is lower than urethane body are laid on selected portions of the cushion body, thereby producing a soft contour of the seat-like object.

For the purpose of producing a soft contour of the seat-like object and of improving sitting comfortableness a slabed urethane body 5 may be used. Such a urethane molded body may be made of materials of different specific gravities.

The above seat-like objects are described as using a urethane molded body. As a matter of course any other cushion materials can be used.

Advantages of a seat-like object making method according to the present invention are as follows:

(a) All the defects caused by using an adhesive agent, listed at the introductory part of the specification can be totally eliminated;

(b) Precision shaping can be easily assured simply by putting pieces of weld sheet at selected welding portions;

(c) Pockets can be easily attached to, for instance, the backside of a seat back in an automobile simply by putting and heating strips of weld sheet on selected narrow areas of a flat cloth in place of applying an adhesive substance to such selected narrow areas with a spray gun.

(d) The thickness, melting point and other physical factors of a weld sheet to be used may be selected in consideration of the sticking strength as required, the kind of a surface layer material to be used, and the final shape of a seat-like object so that a most reliable adhesion may be obtained.

What is claimed is:

1. A method of making a seat-like object comprising the steps of:
   (a) sandwiching and heating a gas permeable surface layer between upper and lower molds with three-dimensional projections having the same shape as an outer shape of a porous cushion body to give the surface layer the same shape as the cushion body;
   (b) preheating said cushion body by filling with hot air, thereby raising the temperature of the cushion body before being stuck together with the surface layer; and
   (c) putting and heating a weld sheet between the preshaped surface layer and the preheated cushion body, thereby causing the weld sheet to melt and stick the surface layer and the cushion body together, the melting of the weld sheet being carried out so as to allow the air to pass through the combined product formed from the surface layer and the cushion body after the weld sheet is melted.

2. A method of making a seat-like object according to claim 1 wherein said cushion body is in the form of a non-skinned urethane molded body or cut-and-shaped urethane slab, and the weld sheet is thin and melts to be partly dispersed in the surface layer and partly into the permeable cushion body.

3. A method of making a seat-like object as in claim 1 where said cushion body is porous; said weld sheet melts at a lower temperature than said surface layer; said weld sheet is thin enough to allow air to pass through a bond layer formed when the weld sheet melts and sticks the surface layer and cushion body together.

4. A method of making a seat-like object according to claim 1, wherein the weld sheet is also pre-shaped to conform to the shape of the surface layer.

5. A method of making a seat-like object according to claim 1 wherein said upper and lower molds have complimentary three-dimensional shapes.

* * * * *